June 30, 1936.  O. M. SUMMERS  2,045,809

REFRIGERATING APPARATUS

Original Filed Oct. 31, 1928

Inventor
Otto M. Summers
By Spencer, Hardman and Foley
Attorneys

Patented June 30, 1936

2,045,809

UNITED STATES PATENT OFFICE 2,045,809

REFRIGERATING APPARATUS

Otto M. Summers, Dayton, Ohio, assignor, by mesne assignments, to General Motors Corporation, a corporation of Delaware Application October 31, 1928, Serial No. 316,331
Renewed June 5, 1935

4 Claims. (Cl. 74—233)

This invention relates to transmission belts, and more particularly to V-shaped belts capable of side drive. When there is a short distance between pulleys and, especially, when means, such as one flat pulley, are used to prevent belt turning, some of the difficulties which have heretofore been major factors in belt design become minor factors and the belt structure may be directed more to providing transverse stiffness and longitudinal flexure with long life at a lower cost.

The principal objects of the present invention are to provide a belt which will meet these conditions, and a specific object is to provide a relatively thin V-shaped belt which will operate satisfactorily on either a grooved pulley or a flat pulley.

Further objects and advantages of the invention will be apparent from the following description, reference being had to the accompanying drawing, wherein a preferred form of the invention is clearly shown.

Figure 1:
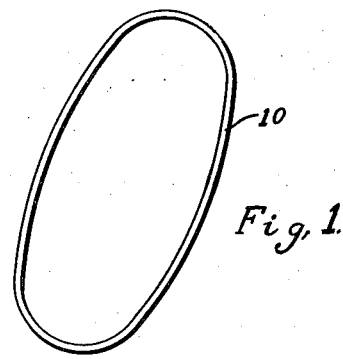
Fig. 1 is a side view of a belt embodying the present invention.

Referring to the drawing, 10 is an endless, vulcanized transmission belt, V-shaped in cross section. In the specific embodiment illustrated in Fig. 2, the inner and outer layers, 11 and 12 respectively, are bias-cut, cross woven fabric, the layer 13 is longitudinal thread fabric and the layer 14 is a relatively stiff rubber composition which may, if desired, contain unorganized cotton fibre.

Figure 2:
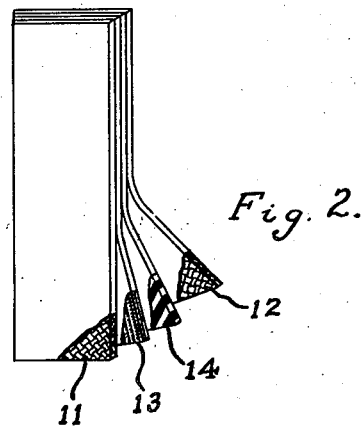
Fig. 2 is a perspective view of a dissected portion of the belt.
Figure 3:
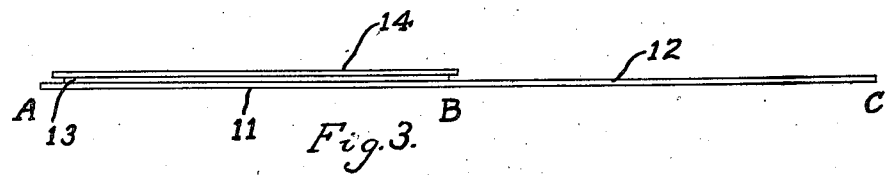
Fig. 3 shows a strip of fabricated material which is employed in making the belt.

In one method of making the belt shown in Fig. 2 the layers are plied as shown in Fig. 3, with the bias fabric layer 12 a continuation of layer 11 and with the ends of the layers 11, 13 and 14 staggered to make a better joint. The belt is then completed by winding the strip, beginning with the end A, lengthwise on a drum to form a cylinder of fabric and rubber, vulcanizing the cylinder, and cutting the cylinder into "raw-edge" belts. This is generally the process of the Short Patent 1,538,303 issued May 19, 1925. However, in the present case, the fabrication can be done on a calender or table instead of directly on the vulcanizing drum, which renders production easier and cheaper.

Figure 4:
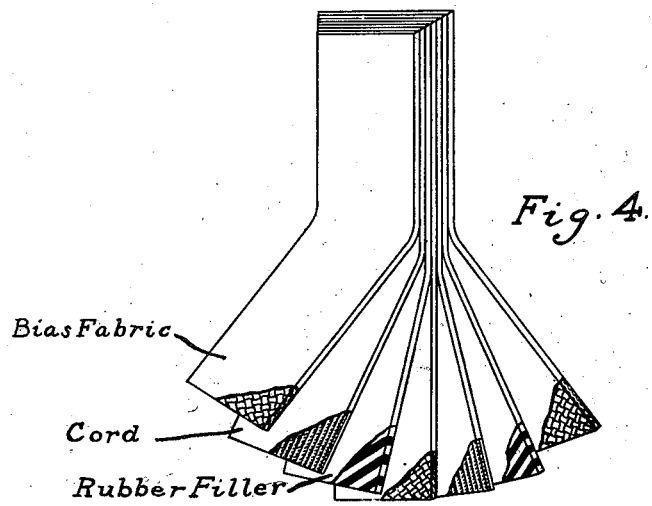
Fig. 4 is an enlarged view of a portion of a modification of the belt shown in Fig. 2.

The modified form of belt shown in Fig. 4 is the same as that shown in Figs. 2 and 3, except that the part A—B of the strip shown in Fig. 3 is made approximately twice as long so that the plied portion of the strip may be wound into two convolutions.

It has been found preferable to use a thin fabricated or plied strip embodied into several turns in a cylinder rather than a strip composed of thick layers made up in a fewer turns. By way of example, I have obtained excellent results with a belt structure such as shown in Fig. 4, with the seven fabric and rubber layers of substantially uniform thickness embodied in a belt 45 inches long, $\frac{7}{8}$ of an inch wide on the inner surface, a V angle of 38° and a thickness of approximately $\frac{5}{32}$ of an inch. This belt is especially adapted for use with a grooved driving pulley and a flat driven pulley as shown in Hull Patent 1,648,178 issued November 8, 1927.

Apparently the cementing together of a large number of thin fabric layers gives the thin belt the requisite high transverse rigidity, and ply separation is avoided by keeping the belt relatively thin and using both thin bias fabric and a thin layer of rubber for the filler portion. The use of a "raw-edge" construction in a cut belt increases the side friction and promotes belt life.

It is obvious that many variations in the structure can be made and among them it may be noted that the side frictional surfaces may be increased by using another turn of bias fabric, or decreased by leaving off one turn, as for example, the length A—B or B—C, Fig. 3, and the structure of the load-carrying portion may be changed without departing from the spirit of the invention. While it is well known that bias fabric may be substituted for rubber filler, in the preferred construction both are employed.

While the form of embodiment of the invention as herein disclosed, constituted a preferred form, it is to be understood that other forms might be adopted, all coming within the scope of the claims which follow.

What is claimed is as follows.

1. A transmission belt formed of separate flat uniform single layers of bias fabric, cord fabric, and rubber filler strip and having a single separate layer of cord fabric provided with a single separate layer of bias fabric upon one side and provided with a single uniform generally flat separate layer of rubber filler strip and a single separate layer of bias fabric on the other side.

2. A transmission belt formed of separate flat uniform single layers of bias fabric, cord fabric, and rubber filler strip and having the separate single layers arranged in the order of a single separate layer of bias fabric, a single separate layer of cord fabric, a single, separate flat uniform rubber filler strip, a single separate layer of bias fabric, a single separate layer of cord fabric, a single separate flat uniform rubber filler strip, and a single separate layer of bias fabric.

3. A raw edge transmission belt comprising a plurality of layers, said layers extending from one edge of the belt to the other edge thereof, each of said layers including a ply formed of bias fabric, a ply formed of strip rubber, and a ply formed of longitudinally extending cords and interposed between the bias fabric ply and the rubber ply, said layers being superimposed upon one another with the bias fabric ply of one layer being adjacent the rubber ply of the other of said layers.

4. A raw edge transmission belt comprising a plurality of layers, said layers extending from one edge of the belt to the other edge thereof, each of said layers including a ply formed of bias fabric, a ply formed of strip rubber, and a ply formed of longitudinally extending cords and interposed between the bias fabric ply and the rubber ply, said layers being superimposed upon one another with the bias fabric ply of one layer being adjacent the rubber ply of the other of said layers, and said belt also having a covering ply disposed over and protecting the rubber ply of one of said superimposed layers.

OTTO M. SUMMERS.